United States Patent [19]

Honekamp et al.

[11] Patent Number: 4,662,489
[45] Date of Patent: May 5, 1987

[54] INTEGRATED PARKING LOCK FOR VEHICLE AXLES

[75] Inventors: Curtis J. Honekamp; Ernest J. Fasick, both of Fort Wayne, Ind.

[73] Assignee: Navistar International Corporation, Chicago, Ill.

[21] Appl. No.: 684,640

[22] Filed: Dec. 21, 1984

[51] Int. Cl.[4] ............................................. F16H 1/445
[52] U.S. Cl. .................................. 192/4 A; 74/710.5; 188/31
[58] Field of Search ............... 192/4 A, 48.5; 188/31, 188/60, 69; 74/710.5, 789

[56] References Cited

U.S. PATENT DOCUMENTS

| 2,730,019 | 1/1956 | Christman | 192/48.5 X |
|---|---|---|---|
| 2,783,661 | 3/1957 | Dryer | 188/69 X |
| 2,947,200 | 8/1960 | Stump | 74/710.5 X |
| 3,265,173 | 8/1966 | Russell | 74/710.5 X |
| 3,439,785 | 6/1969 | Hughson | 192/4 A |
| 3,448,635 | 6/1969 | Nelson | 192/48.5 X |
| 3,814,222 | 6/1974 | Koivunen | 74/710.5 X |
| 3,986,576 | 10/1976 | Cummins et al. | 74/710.5 X |
| 4,207,780 | 6/1980 | Saxton | 74/710.5 |
| 4,526,063 | 7/1985 | Oster | 74/710.5 |

FOREIGN PATENT DOCUMENTS 0186560 11/1982 Japan .................................. 192/4 A Primary Examiner—Rodney H. Bonck
Assistant Examiner—Richard M. Lorence
Attorney, Agent, or Firm—F. David AuBuchon; Dennis K. Sullivan

[57] ABSTRACT

A novel parking brake for motorized vehicles is disclosed. The parking brake is designed to be an integral feature of an essentially conventional drive axle housing. The novel parking brake comprises a sliding clutch shaft attached to a clutch element that, when actuated, engages a complimentary clutch element attached to the drive axle ring gear. Additional gear means prevent the engaged clutch shaft from rotating, and so, prevent the drive axle ring gear from rotating, in effect, securing the vehicle.

10 Claims, 1 Drawing Figure

INTEGRATED PARKING LOCK FOR VEHICLE AXLES

BACKGROUND

1. Field of the Invention

The present invention relates generally to a parking brake for motorized vehicles. More particularly, the present invention relates to a simplified, durable brake system integrated into a vehicle drive axle housing whereby wheel rotation is prevented by engaging the axle ring gear with the stationary rear axle drive assembly housing.

2. Brief Description of the Background Art

Motorized vehicles, and in particular, medium-duty commercial use motorized vehicles, have an extreme need for a brake system to ensure that the vehicle will remain motionless when stopped and/or left unattended. These vehicles are typically held in position when parked by leaving their transmissions "in gear", and by the use of mechanical parking brakes. Commercial vehicles tend to require a parking brake all the more because of inherent drawbacks in their manual transmissions. Defectively designed or excessively worn dog teeth can slip, or disengage, thereby releasing the transmission gear used to hold the vehicle in position. Additionally, outside influences such as joy riders or vandals often intentionally enter a truck cab and release the extremely noticeable gear shift lever. These hazards are exacerbated by the immediate geography in which these trucks are left. These areas typically include driveways, loading docks and dump sites, each of which may be built in a slanted configuration. These grades can be substantial, which only increases the risk to life and property in the event of a run-away vehicle.

To avoid the dangers inherent in a run-away vehicle, manufacturers have developed several positive vehicle locking systems. One of the more cost efficient, and one of the most popular is known as a driveline parking brake. A driveline parking brake comprises a releaseable mechanical interlock, which attaches to the driveshaft of a vehicle to preclude the driveshaft's rotation. The brake is necessarily located behind the transmission, and the aforementioned drawbacks are of no concern, since releasing the transmission would have no effect on the driveline brake. However, these brakes are replete with their own individual disadvantages. If a propeller shaft universal joint is damaged, severed, or removed, the driveline brake is rendered useless since the vehicle can then roll even with a stationary driveshaft. Additionally, driveline brakes require constant pressure for effectiveness. This pressure is typically supplied by cable or hydraulic means. Since cable and hydraulic control systems are prone to failure, the common practice has been to bias the driveline brake system in a released position, whereby a vehicle is not stranded in the event of a breakdown. Therefore, damage to the cable or hydraulic control system automatically defeats the driveline parking brake. Further, the above deficiencies make the driveline brake useless when immobilizing a vehicle for brake or driveline maintenance.

Additional drawbacks are found in that the driveline brake system components are commonly exposed to the elements. This results in rapid deterioration through corrosion and stone damage. Frequent maintenance is required to remove accumulated dirt and debris. The cable control requires costly and frequent lubrication due to dust contamination, and penetrating moisture tends to make the cables sieze in subfreezing weather.

SUMMARY OF THE INVENTION

It is an object of this invention to provide a parking brake that is integrated into a vehicle axle to avoid frequent maintenance.

It is another object of this invention to provide a parking brake that remains engaged without maintaining a constant application force.

It is another object of this invention to provide a parking brake that remains effective during substantially all vehicle maintenance.

In a broad embodiment therefore, these objects and others are provided by an improved parking brake. This parking brake comprises a clutch stack, a first part of which is concentrically attached to the drive axle ring gear. The second part of the clutch stack is concentrically attached to one end of a sliding clutch shaft. The clutch shaft envelopes a differential half-shaft. The clutch shaft includes at its second end radial teeth. At one position the first and second ends of the clutch shaft simultaneously engage the first part of the clutch stack and radial teeth provided in the stationary differential housing, thereby precluding rotation of the ring qear with respect to the differential, and thereby precluding displacement of the vehicle. Sliding the clutch shaft laterally disengages the radial teeth of the clutch shaft from the radial teeth in the differential housing, thereby releasing the ring gear for rotation.

DETAILED DESCRIPTION OF THE INVENTION

Figure 1:
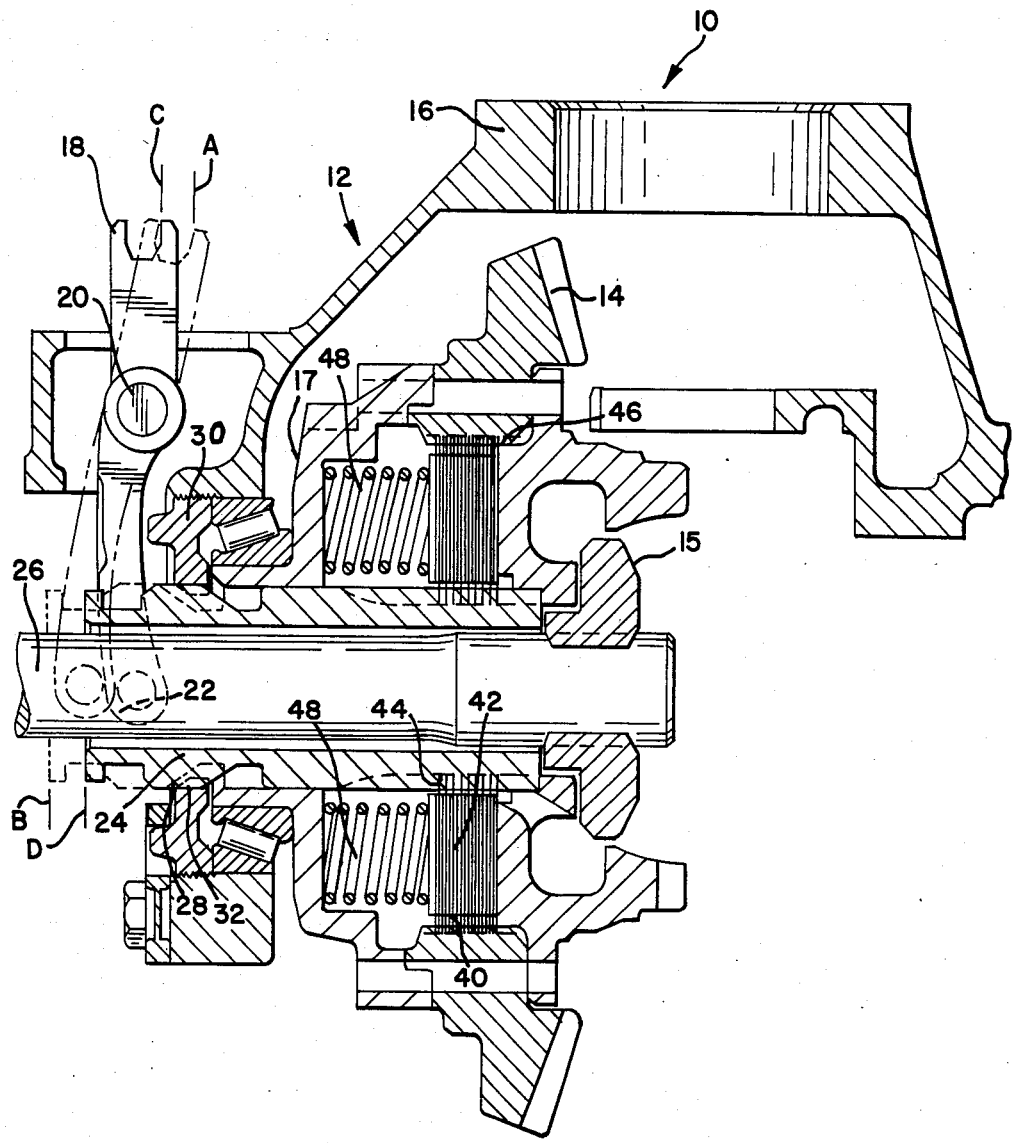
FIG. 1 is a cut-away top view of a drive axle system comprising an embodiment of the present invention.

Referring to the drawing, the parking brake of the present invention is seen, generally designated by the numeral 10. Parking brake 10 is self-enclosed and completely integrated into an otherwise typical rear axle drive assembly 12. Drive assembly 12 functionally consists of a pinion gear (not shown) mounted on an end of a propeller shaft (not shown) connected to the vehicle engine, typically through one or more universal joints. Engine power is transmitted via rotation of the propeller shaft, whereby the pinion gear engages a ring gear 14 which in turn drives a pair of axle half-shafts 26 and therefore, the vehicle, by means of a differential gear system which includes pinion gear 15, and differential ring gear carrier 17. The ring and pinion gears are contained within stationary drive assembly housing 16. The parking brake 10, as preferentially embodied, prevents wheel rotation by engaging ring gear 14 with assembly housing 16, thereby preventing ring gear 14 from rotating and imparting motion to axle half-shaft 26.

To lock ring gear 14 in its fixed or parked position, brake shift fork 18 is engaged by any conventional means (not shown), including, but not limited to: cable, hydraulic, electrical and pneumatic operating systems. Brake shift fork 18 pivots between position A (shown in phantom detail) and position C, about shift fork pin 20 mounted on assembly housing 16. Shift fork 18 is also pivotally mounted at one end 22 to the outer end of sliding clutch 24. Sliding clutch 24 is substantially tubular and is adapted to fit around axle drive half-shaft 26. Brake shift fork 18, when pivoted from position A to position C, necessarily slides clutch 24 from position B (disengaged) to position D (engaged) axially along half-shaft 26.

The outer end of sliding clutch 24 further includes circumferentially positioned, radially disposed teeth 28. The inner periphery of the combination drive half-shaft carrier bearing adjustment nut and locking plate 30, which is fixed against rotation, contains similarly disposed corresponding teeth 32, which are adapted to engage sliding clutch teeth 28 when sliding clutch 24 is disposed in engaged position D, thereby holding sliding clutch 24 against rotation. When sliding clutch 24 is moved to disengaged position B, teeth 28 move laterally away from teeth 32, such that sliding clutch 24 is free to rotate about shaft 26.

Sliding clutch 24 is in permanent contact with annularly shaped clutch pack 42 which extends radially about the inner end 44 of sliding clutch 24. Inner end 44 of the sliding clutch is in continuous engagement with a plurality of disc-like friction elements 40 which extend about the periphery of sliding clutch 24 and form part of a clutch pack 42. The remainder of clutch pack 42 is comprised of a plurality of laterally moveably disc-like non-friction elements 44 which are fixed to the inner periphery of ring gear 14 by means of splines 46 and which are interleaved between friction elements 40. Friction elements 40 and non-friction elements 44 are maintained in constant frictional engagement by means of a plurality of spring means 48, which bear against an internal portion of differential ring gear carrier 17 at one end, and against the outermost element of clutch pack 42 at the other end.

In operation, displacement of sliding clutch 24 to disengaged position B by pivoting shift fork 18 to position A disenqages teeth 28 of the sliding clutch from fixed teeth 32 of locking plate 30, whereby sliding clutch 24 is free to rotate about axle half-shaft 26 as motion to the sliding clutch element is imparted through ring gear 14 and clutch pack 42. When the vehicle is stopped and it is desired to prevent the vehicle from any inadvertent movement, shift fork 18 is moved to postion C, thereby displacing sliding clutch 24 to engaged position D. In this position, teeth 28 engage teeth 32, whereby sliding clutch 24 is locked against rotation. This locking action is imparted to ring gear 14 and the differential drive mechanism of which it is a part, through clutch pack 42, preventing ring gear 14 from rotating. The vehicle is thus in a "park" mode. For the differential ring gear carrier 17 to rotate when the device is in this mode, a torque greater than the capacity of the clutch pack 42 would have to be applied through either the axle shafts or the axle drive pinion. Due to the design of clutch, this torque would have to be substantial. Thus, under normal circumstances, when teeth 28 engage teeth 32, the differential ring gear carrier remains fixed against rotation even though other parts of the drive train, such as the universal joints or the engine, are disconnected from the main drive shaft for repair or replacement.

To release the "park" mode, shift lever 18 is pivoted to move sliding clutch 24 along axle shaft 26 such that teeth 28 and 32 become disengaged, and ring gear 14 and differential ring gear carrier 17 are free to rotate under the influence of the main power train.

It should be understood that various modifications can be made to the preferred embodiment of the invention disclosed herein without departing from the spirit and scope of the disclosure or without the loss of is attendant advantages. Thus, other examples applying the principles described herein are intended to fall within the scope of the invention provided the features stated in any of the following claims or the equivalent of such be employed.

We claim:

1. A braking system for locking a drive axle of a parked vehicle, comprising:
    a stationary housing through which said drive axle extends;
    drive means disposed in said housing for rotating said drive axle;
    spring biased clutch means having one side attached to said drive means and a second side slideably attached to a clutch shaft said clutch shaft being moveable between a first position wherein said clutch shaft is disengaged from said stationary housing, and a second position wherein said clutch shaft engages said stationary housing and said drive means are held through the engagement of said sides of said clutch means against rotation; and
    control means for selectively sliding said clutch shaft between said first and second positions.

2. The braking system for locking a drive axle of a parked vehicle of claim 1 wherein said clutch shaft is of generally hollow construction adapted to coaxially extend around said drive axle.

3. The braking system for locking a drive axle of a parked vehicle of claim 1, said clutch shaft further comprising first locking teeth radially arrayed about an outer periphery of said clutch shaft, said stationary housing further comprising second radially arrayed fixed locking teeth to engage said first teeth when said clutch shaft is in said second position, whereby the engagement of said teeth precludes the rotation of said clutch shaft.

4. The braking system for locking a drive axle of a parked vehicle of claim 1, said control means comprising a shift fork mounted to said stationary housing and operably connected to said clutch shaft, said shift fork pivotable from a first position to a second position to move said clutch shaft between said first and second positions.

5. A brake system for locking a drive axle of a parked vehicle, comprising:
    a stationary housing through which said drive axle extends, said stationary housing including teeth means disposed in fixed position relative to said housing;
    differential drive means operatively disposed within said stationary housing and having a ring gear input and an output gear drivingly coupled to said drive axle;
    a friction clutch means attached to said ring gear, said drive means being held in continuous frictional engagement through said friction clutch means with a first clutch element;
    a second clutch element coupled with said first clutch element, said second clutch element being selectively interdigitated with said housing teeth means whereby rotation of said ring gear is prevented.

6. The braking system for locking a drive axle of a parked vehicle of claim 5 wherein said second clutch element is carried by one end of a slideable clutch shaft including said first clutch element, said clutch shaft being adapted so as not to rotate when said second clutch element engages said teeth means.

7. The braking system for locking a drive axle of a parked vehicle of claim 6, further comprising pivoting shift fork means for selective engagement of said second clutch means with said teeth means.

8. The braking system for locking a drive axle of a parked vehicle of claim 6, said clutch shaft adapted to extend around a half-shaft of said drive axle.

9. A braking system for locking a drive axle of a parked vehicle, comprising:
- a stationary housing through which said drive axle extends; differential drive means disposed in said housing for rotating said drive axle;
- clutch means attached to said drive means and including an axially slideable clutch shaft moveable between a first position and a second position;
- control means for selectively sliding said clutch shaft between said first and second positions;
- said clutch shaft extending around said drive axle, said clutch shaft provided at one end with a multiplicity of teeth radially arrayed about an outer periphery of said clutch shaft, said clutch shaft further provided at a second end with a first clutch element, said drive means provided with a second clutch element;
- spring biasing means whereby said first and said second clutch elements are continually held in frictional engagement;
- said stationary housing provided with radially arrayed teeth adapted to engage said clutch shaft teeth when said clutch shart is in said second position whereby said drive means is held against rotation with respect to said stationary housing and adapted to be out of engagement with said clutch shaft teeth when said clutch shaft is in said first position whereby said drive means is rotatable relative to said stationary housing.

10. The braking system for locking a drive axle of a parked vehicle of claim 9 further comprising pivoting shift fork means for selective actuation of said system.

* * * * *